Sept. 25, 1951  R. S. ENABNIT  2,568,848
METHOD OF MAKING AIR BAG FOR USE IN HIGH-FREQUENCY
ELECTRICAL VULCANIZATION
Filed May 20, 1950  2 Sheets-Sheet 1

INVENTOR
Robert S. Enabnit

BY
R. L. Miller
ATTORNEY

INVENTOR
Robert S. Enabnit
BY
R. L. Miller
ATTORNEY

Patented Sept. 25, 1951

2,568,848

UNITED STATES PATENT OFFICE 2,568,848

METHOD OF MAKING AIR BAG FOR USE IN HIGH-FREQUENCY ELECTRICAL VULCANIZATION

Robert S. Enabnit, Cuyahoga Falls, Ohio, assignor to Wingfoot Corporation, Akron, Ohio, a corporation of Delaware Application May 20, 1950, Serial No. 163,315

14 Claims. (Cl. 154—85)

1

This invention relates to methods of manufacturing air bags or similar articles, especially to air bags, having electrical conductors therein, for use in the vulcanization by high frequency electrical energy of articles, such as pneumatic tires, that are made from rubber and rubber-like materials.

One of the recent developments in the rubber industry is that of vulcanizing rubber by the use of high frequency electrical energy. Such vulcanization procedure has some advantages over other vulcanizing processes and a great deal of experimental and development work has been done in an effort to determine just how successful high frequency vulcanization of relatively large rubber articles, such as tires, would be. One of the major problems that arises is how the electrical frequency energy can be applied to the unvulcanized tire to vulcanize same. Since it is obviously highly desirable to apply the high frequency electrical energy process to vulcanization procedures with a minimum of departure from conventional tire building and vulcanization operations, it follows that a high electrical frequency type of air bag for a tire should be capable of being bagged into, and removed from conventional drum built pneumatic tires in accord with conventional procedures. Hence the air bag used must be sturdy, resilient and flexible, and be able to stand severe and repeated flexure without damage.

The general object of the present invention is to provide a new and improved method of manufacturing air bags for use in the high frequency electrical vulcanization of tires or other articles, which bags can be expanded into engagement with the tire.

Another object of the invention is to provide a new method of producing a rubber ply having a plurality of separate electrical conductors extending transversely thereof with the conductors being substantially arcuately positioned.

Another object of the invention is to produce a sturdy air bag having a long service life for use in high frequency electrical vulcanization.

Another object of the invention is to use tire building methods in the manufacture of an air bag.

A further object of the invention is to provide an air bag building method wherein the air bag is built upon a drum and initially is cured when in toroidal shape and thereafter has a separate filler strip secured thereto to form an air bag which is substantially annular in radial section and has an external periphery substantially con-

2 forming to the internal periphery of a tire or other article to be vulcanized by use of such air bag.

A further object of the invention is to position numerous short electrical conductors in an air bag in such a way as not to avoid or curtail desired resiliency, flexibility and inflatability of the air bag.

Another object of the invention is to produce an air bag for use in high frequency electrical vulcanization wherein such air bag is made in a plurality of units that are combined to produce the desired air bag.

Another object of the invention is to provide an air bag which is manufactured by a relatively inexpensive, uncomplicated method so that an air bag having desirable properties can be produced at a satisfactory cost.

Yet another object is to use a special conductor containing ply in the manufacture of an air bag.

The foregoing and other objects and advantages of the invention will be made more apparent as the specification proceeds.

For a better understanding of the present invention, reference should be had to the accompanying drawings, wherein.

Figure 8:
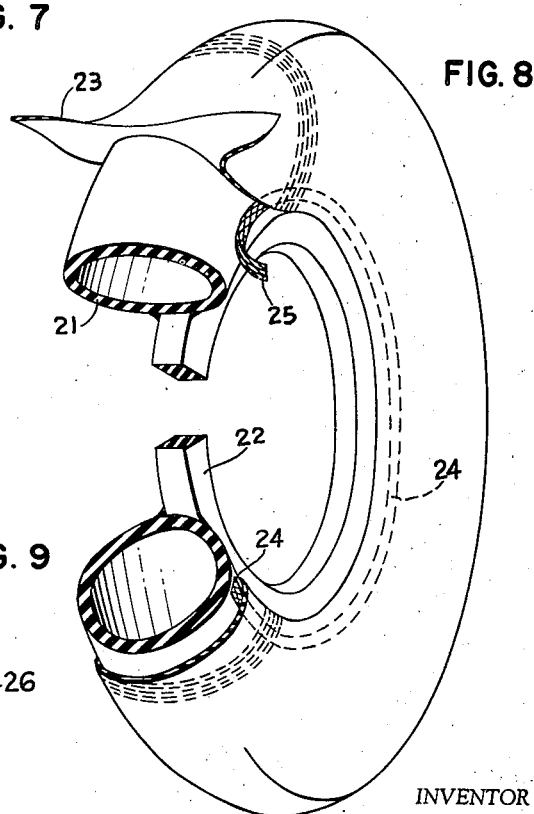
Figure 9:
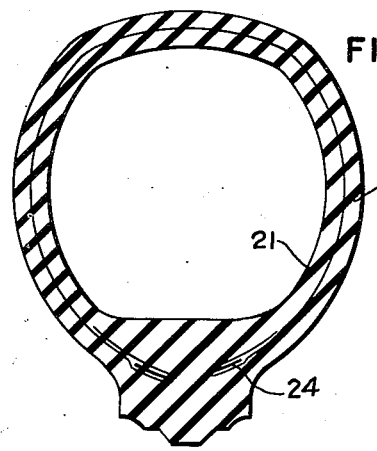

Fig. 8 is a perspective view of the initial assembly by a modified method of air bag components including an air bag base core which has a relatively solid dielectric insulator strip on the inner periphery of the core and a partially pulled back electro-conductive wire containing ply on the outer periphery of the air bag core; and Fig. 9 is a section of the air bag made from the bag components of Fig. 8 with an air bag cover having been secured thereto.

The present invention, broadly speaking, relates to a method of making an electro-conductive air bag wherein the method includes the steps of forming a rubber ply containing a plurality of substantially parallel wires therein, securing the different wires together for transmission of electrical energy thereto, shaping the ply to cylindrical form, applying a further rubber ply to the wire containing rubber unit, forming the resultant cylindrical unit to tire shape and vulcanizing such unit, inserting a dielectric insulator strip intermediate the bead portions of the air bag unit, and securing such insulator strip in position.

It will be understood that in the following specification, the term "rubber" will be used to refer to any natural or synthetic rubber, or rubber-like material or synthetic material having substantially similar chemical composition or physical properties to natural rubber, and to equivalents therefor.

Reference now should be had to the details of the structure and principles shown in the drawings, and wherein a conventional cylindrical roll 1 is provided for building up a ply of an air bag thereon. The roll 1 is journaled in any suitable manner in spaced portions of a frame 2, and a relatively small backing roll 3 also is suitably journaled in the frame 2 and adapted to bear upon the periphery of the roll 1. The roll 1 may be carried in a vertically adjustable position on the frame 2 and it may be resiliently urged down towards the backing roll 3 for contact therewith so as to squeeze or compress any material applied to the roll 1 by the roll 3. The roll 1 is driven in any conventional manner and a belt 4 is shown and connects suitable driving means (not shown) with a driven pulley 5. The pulley 5 is positioned on a shaft 6 which also has a small driving gear thereon and which is journaled in the frame 2. A support shaft for the roll 1 has a relatively large driven gear 7 secured thereto meshed with the driven gear on shaft 6 through idler gear 8 for rotating roll 1.

Figure 1:
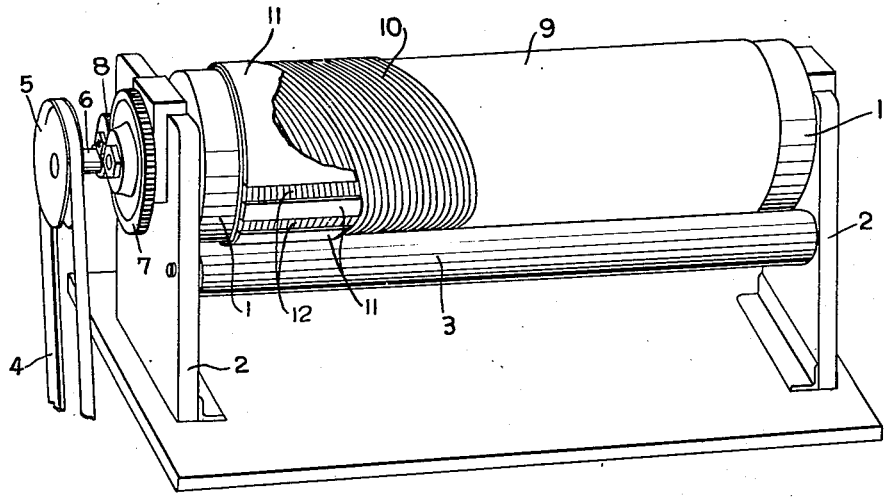
Fig. 1 is a perspective view of one type of apparatus for forming one ply used in the method of making an air bag of the invention.

A rubber ply is suitably built up on the surfaces of the roll 1 as it is rotated, as by applying a sheet of rubber thereto. Fig. 1 shows a rubber ply or layer 9 on the surface of the roll 1 and extending substantially the length thereof. In order to provide electrical conductors in the air bag being formed in accordance with the method of the invention, a plurality of immediately adjacent convolutions of wire 10 are coiled or wrapped around the periphery of the roll 1 with the different convolutions of the wire 10 all being substantially parallel to each other and with such convolutions forming an appreciable angle, such as about 30° to 60°, to or with the plane normal to the axis of the roll 1. In other words, the convolutions of the wire 10 are elliptical and are wound obliquely around the periphery of the roll 1 either manually or by suitable mechanism. Since the rubber ply 9 is unvulcanized and is relatively soft and resilient, the wire 10 can bite or seat into the rubber ply 9 and be retained in a given position thereby. The wire may be either a braided or twisted cable and usually is of approximately 70 mils in diameter, more or less dependent on the size tire the air bag is designed to be used in. Such wire normally is made from brass, or is brass plated to facilitate bonding same with the rubber plies with which such wire is associated. Of course, the wire should have desirable flex life since the air bag in which it is being assembled is subjected to severe flexing and pressures during its use. As the roll 1 is rotated and wire is applied to the surface thereof, the backing roll 3 forces the wire 10 into the surface of the rubber ply 9. Usually, the roll 1 is positioned in the frame 2 by use of compression springs which resiliently urge the roll 1 towards the backing roll 3.

After a layer of convolutions of the wire 10 have been applied to the surface of the rubber 9, normally a second rubber ply 11 is suitably applied to the surfaces of the wire 10. This ply 11 extends completely over the exposed surfaces of the convolutions of the wire 10 except for two longitudinally extending exposed areas of the wire 10 that are left uncovered to facilitate engagement of a common conductor with each such area, as will be hereinafter explained. The longitudinally exposed areas are located so that a longitudinal line passing through one of the ends of the major axis of each wire convolution lies intermediate said two exposed areas 12.

Figure 2:
Fig. 2 is a broken section taken through a flat layout of a ply of rubber having a plurality of electrical conductors embedded therein, which section is taken on a line extending transversely of the rubber ply.
Figure 3:
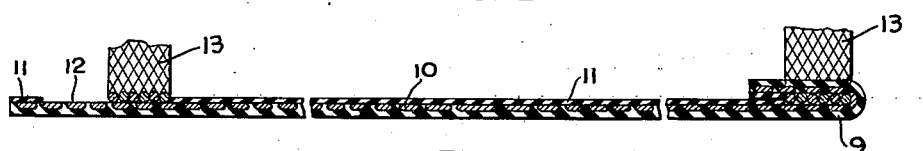
Fig. 3 is a broken cross section like Fig. 2 of the ply of Fig. 2 after an electrical terminal conductor has been associated therewith, with one portion of the drawing indicating the next step in the method of manufacture of an air bag.
Figure 4:
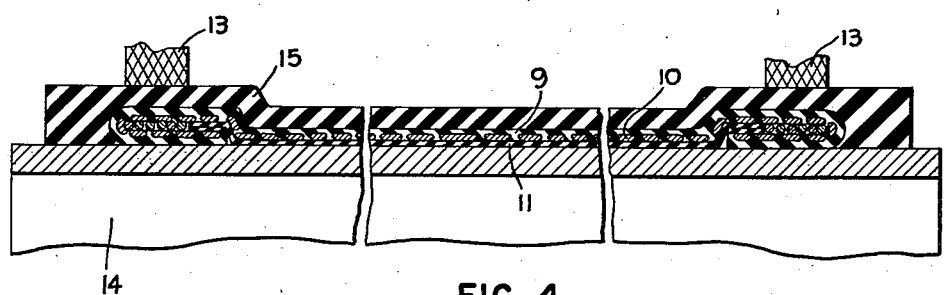
Fig. 4 is a section showing the rubber ply of Fig. 3 as applied to the building drum, and with a further rubber ply thereon.

The two longitudinally extending exposed portions of the convolutions of the wire 10, which are indicated by the numeral 12, are indicated in Figures 2 and 3 and the resultant ply unit formed from the plies 9 and 11 and the wire convolutions 10 is cut from the roll 1 by any suitable device with such cut extending on a longitudinally extending line parallel to the longitudinal axis of the roll 1. The ply unit is cut intermediate the closely adjacent longitudinally extending openings or spaces 12 which leave portions of the wire 10 exposed. Fig. 3 best shows that a braided type of conductor wire, or other suitable flexible conductor 13, which usually is of substantially rectangular shape in cross section and has flat surfaces, is applied to or laid on each of the openings 12 in the ply unit with such conductors 13 extending longitudinally of the plies adjacent each lateral margin thereof. Normally the ply unit cut from the roll 1 is laid out on a flat surface with the exposed areas 12 up to prepare such unit for the next steps in the method of the invention. A double contact of each wire convolution is obtained with the conductors 13 adjacent each end of the sections of the wire 10 formed in the ply unit by cutting same from the roll 1. Such action is achieved by folding the laterally extending side portions of the ply unit inwardly over and down upon the conductors 13, as indicated in Fig. 3. These inwardly turned portions of the ply unit are suitably pressed down into engagement with the remaining portions of the ply to secure the conductors 13 in place. Normally the ply unit thus formed is turned over so that the folded over portions are down and then applied to a machine such as a cylindrical tire building drum indicated by the numeral 14. The end portions of the ply are secured together to form a cylindrical band and then one or more rubber plies 15 are next associated with the air bag unit to complete the assembly of the air bag unit in accordance with conventional tire manufacturing procedure. Of course, the ply 15 is of any desired composition and size.

Figure 5:
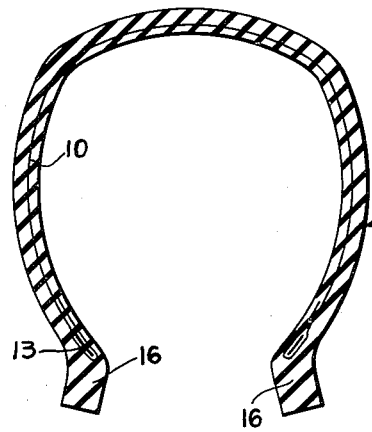
Fig. 5 is a section of the air bag of Fig. 4 after it has been formed to toroidal shape and been vulcanized.

The air bag is next stripped from the tire building drum 14 by collapsing same and is formed to toroidal shape in accordance with conventional tire shaping procedure after which the air bag unit is suitably vulcanized whereby an air bag body of the general shape in section shown in Fig. 5 is produced.

It will be appreciated that when the conductors 13 are associated with air bag unit, end portions of such conductors 13 are left exposed or protruding from the remainder of the pair bag unit for passage of electrical energy to the resultant air bag unit produced. It also should be noted that in cutting the air bag unit or ply from the roll 1, the wire 10 is severed into a plurality of relatively short lengths with such wires extending in more or less arcuate form across the rubber ply from one lateral portion thereof to the other. Such wire sections naturally retain the same relative positions as they had initially as the air bag body is built up from such ply on a conventional tire building drum. This positioning of the wire pieces in the air bag bodies permits same to be shaped to tire section in cross sectional contour and for the resultant air bag to be expanded in use without such wires being severely stressed, or curtailing movement and change of shape of the air bag body in any manner, since the wires form loops at an appreciable inclination to a radius of the bag.

Figure 6:
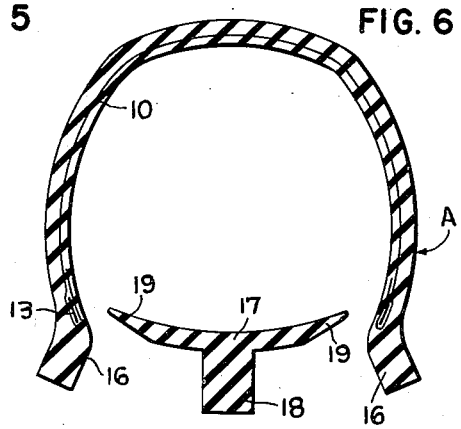
Fig. 6 is a section showing the step of associating a bead or base filler strip with the partly formed air bag of Fig. 5.
Figure 7:
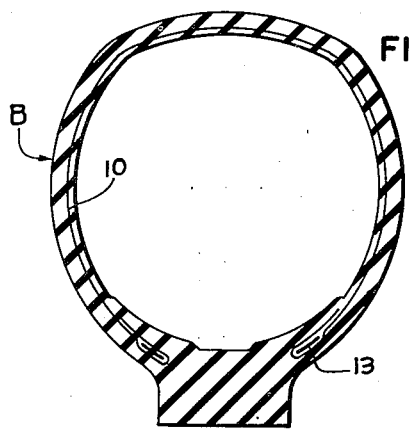
Fig. 7 is a section showing a completed air bag made from the air bag components shown in Fig. 6.

In order to complete the air bag body which is indicated at A in Fig. 5, it will be realized that some type of solid reinforcing member must be positioned intermediate bead portions 16 which are provided on the air bag body of Fig. 5 since this air bag body is provided with a circumferentially extending open radially inner surface. Fig. 6 indicates that a separate filler strip 17 can be provided for filling up the gaps between the beads 16 of this tire bag body of Fig. 5. This filler strip may be made from any desired material although normally it is preferred to form same from a rubber which has a high dielectric insulating strength. The filler strip includes a solid center portion 18 that is adapted to be placed between the beads 16 and completely fill or occupy the space therebetween. The filler strip 17 also has a pair of fins or lip portions 19 which extend therefrom and are adapted for engagement with the inner surfaces of the air bag body indicated in Figures 5 and 6. Such fins 19 can be formed of any suitable material, usually rubber, and the filler strip may be at least partially pre-vulcanized to the desired shape prior to assembly with the air bag unit A. The solid center 18 may be built up from a plurality of relatively thin plies of rubber or similar material. To complete the assembly of an air bag of the invention, the filler strip 17 is suitably cemented or vulcanized to the beads 16 of the air bag body A to form an air bag B having an annular cross-sectional contour and shown in Fig. 7.

The provision of electrical energy supply current to the different wires cut from the wire 10 in the air bag body may be done in any desired manner. Usually this is done by securing the end portions of the conductors 13 to the metallic valve stem means (not shown) provided for use with the air bag. It will be realized that the air bag of the invention may be of short circumferential length, if desired, or that the air bag may form a complete annular structure, as desired.

A modification of the method of the invention is shown in Figures 8 and 9 and in this instance, a pre-vulcanized annular rubber air bag core or tube 21 is provided and it has secured to the radially inner surface thereof a solid rubber filler strip 22 that may be substantially rectangular in section. The electrical energy conductive means used in the air bag shown in Figures 8 and 9 is provided by means of a ply 23, which is similar to the ply produced as a result of the method steps shown in Fig. 3 of the drawings, and is suitably applied to the peripheral portion of the rubber core 21. This rubber ply 23 has a plurality of angularly disposed transversely extending conductors therein with longitudinally extending conductors 24 also being present in the ply 23 and extending substantially in an annular manner in the air bag assembly. A portion 25 of the conductors 24 is left exposed or protruding from the rubber ply 23 to connect to suitable valve stem or other means for transferring electrical energy to the individual wire sections or conductors embedded in the rubber air bag of the invention. After the filler strip 22 and rubber ply 23 are applied to or associated with the rubber core 21, this assembly is vulcanized to bond the portions thereof together. In finishing the air bag, a preformed and accurately sized air bag cover 26 is secured to the resultant unit to complete the air bag assembly. Such cover 26 usually has been separately vulcanized and may be merely cemented to the remainder of the air bag assembly.

It should be noted that in both the air bags of the invention the current conducting wires extending substantially around the periphery of the substantially annular section of the air bag of the invention will in all events be lying at a substantial angle of from about 30 to 60 degrees with a radius of the air bag. These conductor wires hence are of substantially oval-shape and have both ends of each wire adjacent the same circumferential portion of the air bag whereas the remaining portion of the convolution or loop of the wire extends appreciably circumferentially from the terminal portion of the wire. This positioning of the conductors in the air bag is greatly desirable and facilitates permitting the air bag to expand when positioned in a tire for forcing the tire out against the tire mold during the vulcanization process.

From the foregoing, it should be realized that a new air bag building method has been provided and that this new air bag building method in general produces the air bag by the use of tire building procedures. An effective method is disclosed for producing or depositing wires in an air bag structure with such wires not curtailing the desired expansion action of a completed air bag when in use. Hence it is submitted that the objects of the invention have been achieved.

It will be realized that in severing the built-up ply from the roll 1, this ply may be provided with only one longitudinally extending exposed portion wherein the wires on the roll are exposed. In such instances the ply structure would usually be cut longitudinally at substantially the middle portion of this exposed section of the built-up ply structure.

While certain representative embodiments and details have been shown for the purpose of illustrating the invention, it will be apparent to those skilled in this art that various changes and modifications may be made therein without departing from the spirit or scope of the invention.

What is claimed is:

1. A method of making an air bag comprising the steps of forming a rubber ply in a cylindrical shape, embedding a plurality of wires in the ply with the outer surface of the wires exposed, severing the cylindrical ply along a longitudinally extending line, placing a longitudinally extending electrical conductor on the exposed surfaces of the wires adjacent each longitudinal margin of the ply, folding the margins of the ply inwardly on to the conductors, arranging the ply in annular form with the wires extending arcuately substantially transversely thereof, applying at least one rubber ply to the surface of the wire containing ply to form a unit thereof, forming such unit to substantially a tire shape having bead portions around the inwardly directed margins thereof, vulcanizing the resultant unit, inserting a rubber filler strip intermediate the margins of the beads of the unit, and vulcanizing the insert to the unit.

2. That method of making an air bag which comprises forming a rubber ply having a plurality of wires embedded therein and extending substantially transversely thereof but exposed on one surface of the ply adjacent the lateral margins thereof, placing a longitudinally extending electrical conductor on the exposed surfaces of the wires adjacent each longitudinal margin of the ply, folding the margins of the ply inwardly onto the conductors, arranging the ply in annular form with the wires extending substantially transversely thereof, applying at least one rubber ply to the surface of the wire containing ply to form a unit thereof, forming such unit to substantially tire shape in section, vulcanizing the resultant unit, inserting a filler strip intermediate the margins of the bead portions of the tire-shaped unit, and securing the insert to the unit.

3. A method of making an air bag comprising the steps of forming a rubber ply having a plurality of wires carried thereby and extending substantially transversely thereof, securing a longitudinally extending electrical conductor to the wires, applying at least one rubber ply to the surface of the wire containing ply to form a unit thereof, forming such unit to substantially tire shape in section, vulcanizing the resultant unit, inserting a high frequency insulation and filler strip intermediate the margins of the beads of the tire-shaped unit, and securing the insert to the unit.

4. A method of making an airbag for use in high frequency vulcanization of rubber products, comprising the steps of forming a rubber ply in a cylindrical shape, imbedding a plurality of electrical conductors in the ply, severing the cylindrical ply along a longitudinally extending line, electrically securing said conductors together for forming an electrical circuit therewith, applying the ply to the radially outer portion of an air bag core, applying a solid dielectric filler and spacer strip to the radially inner surfaces of the air bag core, vulcanizing the assembled air bag unit, forming an accurately sized outer cover for an airbag, and securing the outer cover to the periphery of the air bag core.

5. A method of making an airbag for use in high frequency vulcanization of rubber products, comprising the steps of forming a rubber ply having a plurality of electrical conductors extending substantially transversely thereof, electrically connecting said conductors along at least one margin of the ply, applying the ply to an annular in section air bag core on the periphery thereof, applying a solid dielectric strip to the radially inner surfaces of the air bag core, electrically securing said conductors together for forming an electrical circuit therewith, vulcanizing the assembled air bag unit, making a rubber outer cover for an airbag, vulcanizing such outer cover, and cementing the outer cover to the air bag core.

6. A method of making an airbag for use in high frequency vulcanization of rubber products, comprising the steps of forming a rubber ply having a plurality of electrical conductors extending substantially transversely thereof, electrically securing said conductors along one margin of the ply for forming an electrical circuit therewith, applying the ply to a substantially annular in section air bag core on the periphery thereof, applying a dielectric strip to the radially inner surfaces of the air bag core, and vulcanizing the assembled air bag unit.

7. A method of making an air bag for use in high frequency vulcanization of rubber products, comprising the steps of forming a hollow cylinder of rubber, applying a layer of convolutions of wire to the rubber cylinder on the outer surface thereof which convolutions intersect a plane normal to the longitudinal axis of the cylinder at an angle of about 30° to 60°, applying a rubber ply to all but a pair of closely adjacent but longitudinally aligned portions of the convolutions of wire, severing the cylindrical unit along a longitudinally extending line intermediate the closely spaced exposed portions of the wire, applying a conductor to each exposed longitudinally aligned exposed sections of wire, securing the conductors in position, and vulcanizing the assembly.

8. A method of making an air bag for use in high frequency vulcanization of rubber products, comprising the steps of forming a hollow cylinder of rubber, applying a layer of convolutions of wire to the rubber cylinder on the outer surface thereof which convolutions each are substantially planar and intersect a plane normal to the longitudinal axis of the cylinder at a substantial angle thereto, applying a rubber ply to all but a longitudinally aligned portion of the convolutions of wire, severing the cylindrical unit along the said longitudinally extending line, securing the wires together for transmission of electrical energy thereto, and vulcanizing the assembly.

9. In a method of making an air bag for use in high frequency vulcanization of rubber products, the steps of forming a substantially cylindrical layer of substantially planar convolutions of wire which convolutions intersect a plane normal to the longitudinal axis of the cylinder formed thereby at a substantial angle thereto, applying a rubber ply to the convolutions of wire, severing the cylindrical unit along a longitudinally extending line parallel to the axis of the cylinder, securing the wires together for forming an electric circuit therewith, and vulcanizing the assembly.

10. In a method of making an air bag for use in high frequency vulcanizing of rubber products, the steps of forming a cylindrical layer of convolutions of wire which convolutions intersect a plane normal to the longitudinal axis of the cylinder formed thereby at a substantial angle thereto, applying a rubber ply to all but a strip of longitudinally aligned portions of the convolutions of wire, severing the cylindrical unit along a longitudinally extending line, applying a conductor to the exposed longitudinally aligned exposed sections of wire, securing the conductor in position in contact with the severed wire convolutions, and vulcanizing the assembly.

11. In a method of making an air bag for use in high frequency vulcanization of rubber products, the steps of forming a cylindrical layer of convolutions of wire, applying a rubber ply to all but a strip of longitudinally aligned portions of the convolutions of wire, severing the cylindrical unit along a longitudinally extending line, connecting said wire convolutions for transmittal of electrical energy thereto, and vulcanizing the assembly.

12. A method of making an air bag for use in high frequency vulcanization of rubber products, comprising the steps of forming a hollow cylinder of rubber, applying a layer of convolutions of wire to the rubber cylinder on the outer surface thereof which convolutions each are substantially planar and intersect a plane normal to the longitudinal axis of the cylinder at a substantial angle thereto, applying a rubber ply to the convolutions of wire but leaving a longitudinally extending strip of the convolutions exposed, severing the cylindrical unit along the said longitudinally extending strip to form a ply unit therefrom applying a conductor to the exposed strip of the convolutions, folding at least one lateral marginal portion of the ply unit over onto the conductor, turning the ply unit over, forming the ply unit to tire shape with the folded over margin of the ply unit being on the inner surface of the resultant structure, and vulcanizing the assembly.

13. A method of making an air bag for use in high frequency vulcanization of rubber products, comprising the steps of forming a hollow cylinder of rubber, applying a layer of convolutions of wire to the rubber cylinder on the outer surface thereof which convolutions each are substantially planar and intersect a plane normal to the longitudinal axis of the cylinder at a substantial angle thereto, severing the cylindrical ply unit of wire convolutions and rubber along a longitudinally extending line, connecting the individual wires in the ply unit for transmission of electrical energy thereto, and vulcanizing the assembly.

14. A method of making an air bag for use in high frequency vulcanization of rubber products, comprising the steps of forming a hollow cylinder of rubber, applying a layer of convolutions of wire to the rubber cylinder on the outer surface thereof which convolutions each are substantially planar and intersect a plane normal to the longitudinal axis of the cylinder at a substantial angle thereto, applying a rubber ply to the convolutions of wire but leaving a longitudinally extending strip of the convolutions exposed, severing the cylindrical unit along the said longitudinally extending strip to form a ply unit therefrom, applying a conductor to the exposed strip of the convolutions, and vulcanizing the assembly.

ROBERT S. ENABNIT.

REFERENCES CITED

The following references are of record in the file of this patent:

UNITED STATES PATENTS

| Number | Name | Date |
|---|---|---|
| 1,923,736 | Lewis et al. | Aug. 22, 1933 |
| 2,308,268 | Corson | Jan. 12, 1943 |
| 2,451,992 | Te Grotenhuis | Oct. 19, 1948 |
| 2,476,817 | Charnes | July 19, 1949 |